United States Patent Office 3,442,927
Patented May 6, 1969

3,442,927
FLUOROXY COMPOUNDS
Phillip G. Thompson, St. Paul, and Julianne H. Prager, Arden Hills, Minn., assignors to Minnesota Mining and Manufacturing Company, St. Paul, Minn.
No Drawing. Continuation-in-part of application Ser. No. 172,062, Feb. 7, 1962. This application Feb. 3, 1964, Ser. No. 343,444
Int. Cl. C07c 71/00
U.S. Cl. 260—453                      16 Claims This is a continuation-in-part of application Ser. No. 172,062, filed Feb. 7, 1962, now abandoned.

This invention relates to fluorinated oxidant compounds and more particularly to certain novel perfluoroalkyl substituted oxyfluorides and the process for their production.

Trifluoromethyl oxyfluoride has been prepared by the direct fluorination of carbon monoxide and is a relatively stable substance. Higher members of this series have not, so far as known, been produced heretofore in stable form.

It is an object of this invention to provide certain highly fluorinated oxyfluoride compounds. It is another object of this invention to provide new fluorinated oxyfluoride group-containing oxidants. Other objects of the invention will become apparent from the disclosures hereinafter made.

It has been found that compounds having the formula:

$$(R)_nC(F)_mOF$$

wherein R represents a member of the group consisting of perfluorinated alkyl radicals having from 1 to 18 carbon atoms, $n$ is an integer from 1 to 3, and $m$ equals $3-n$, are useful fluorinated oxidizing agents. The compounds of the invention range in physical properties from gases to oily or waxy materials, or solids when they are of higher molecular weight.

In the general formula set forth above, R is a perfluoroalkyl radical. Fully equivalent with acyclic, branched or straight chain perfluoroalkyl radicals for the purpose of the invention are perfluoroalkyl radicals containing perfluorinated carbocyclic and heterocyclic rings, for example, perfluoropyridyl, perfluorocyclohexyl, perfluorocyclohexylethyl and the like radicals. Perfluoroalkyl radicals containing other atoms in the chain are also equivalent for the purposes of this invention, as, for example, peroxy, oxa, aza and the like atoms or groups of atoms can be present. Likewise, the perfluoroalkyl radicals can be substituted by certain electro-negative groups, which may replace one or more fluorine atoms or $CF_3$ groups. They are characterized by being free from hydrogen, non-reducing with respect to the —OF group and having a Hammett meta sigma parameter equal to or greater than $+0.3$. (Reference is here made to the report of H. H. Jaffe, Chemical Reviews, vol. 53, pp. 191–261, 1953.) Such groups include —$NF_2$, =$NF$, —$NO_2$, —$ONF_2$, perchloryl and the like groups. These substituents when present do not interfere with the fluorination of the starting compound, and may contribute significant additional oxidizing power to the compounds of the invention. Perfluoroalkyl radicals thus substituted are included within the scope of R as above defined.

As noted hereinabove, while trifluoromethyl oxyfluoride has been prepared, and found to be sufficiently stable to permit of manipulation, higher homologs of this compound have not been obtained heretofore. While the formula for pentafluoro-ethyl and heptafluoroisopropyl hypofluorites has been set forth, for example, in the report of Cady, Proceedings of the Chemical Society, April 1960, pages 133–138, it has been stated that no compounds of this type other than perfluoromethyl oxyfluoride have been obtained.

Contrary to the observations of the prior art, it has now been found that by using the process herein set forth, it is possible to obtain the formerly inaccessible members of this series. While applicants do not wish to be bound by theory, it is believed that this process produces the compounds in a condition free from agents which cause fragmentation. It is well known that fluorination processes are extremely severe and destructive to the compounds being fluorinated. In addition to the desired products, numerous fragmentation products are commonly formed by prior art processes, as well as fluorine compounds formed by reaction with the apparatus itself. Among the various products which are formed or are already present, it is believed there are agents which catalyze or initiate the decomposition of the higher perfluoroalkyl oxyfluorides. Consequently, before the latter compounds can be isolated, they react or decompose and thus they cannot be recovered from the reaction mixtures.

Certain hydrogen-containing materials are fragmentizing agents which cause higher perfluoroalkyl oxyfluorides to decompose completely. Pentafluoroethyl oxyfluoride substantially free from fragmentizing agents underwent no change during storage at room temperature for many months. Decomposition can be followed by observing the change in pressure of the system, inasmuch as two moles of decomposition products are formed for every mole of pentafluoroethyl oxyfluoride decomposed; or by examining the infrared spectrum of the mixture. Furthermore, vapor phase chromatography can be used to isolate and identify the products of the fragmentation process. If pentafluoroethyl oxyfluoride is caused to decompose by an equimolar amount of methane, not only can carbonyl fluoride and tetrafluoromethane be isolated by means of the vapor phase chromatographic procedure, but methane is also recovered in substantial amount. No other compounds are observed except in minute amounts. Similar results are obtained with as little as 0.04 mole of methane.

Conversely, when methane is mixed with trifluoromethyl oxyfluoride, the mixture is found to be stable at room temperature in the absence of a spark or of ultraviolet irradiation.

Other compounds which bring about the decomposition of higher perfluoroalkyl oxyfluorides include methyl trifluoroacetate, hydrocarbon-type stopcock greases, such as Apiezon grease, some inorganic fluorides and polyvinyl chloride. It has been found that decomposition or fragmentation can even occur in the very short time during which the fraction containing the desired higher oxyfluoride, e.g. pentafluoroethyl oxyfluoride passes between the separating column and the collection trap, when polyvinyl chloride tubing was used for connecting the exit of the chromatography apparatus to the collection system. When this was replaced by polytetrafluoroethylene tubing, pure pentafluoroethyl oxyfluoride free of carbonyl fluoride and tetrafluoromethane was isolated. This phenomenon of the fragmentation of higher perfluoroalkyl oxyfluorides at the C—C bond adjacent to the OF group, by certain fragmentizing agents is surprising and is not believed to have been predictable from consideration of the behavior of trifluoromethyl oxyfluoride or other fluorine-containing compounds, such as those containing =NF or —SF groups.

The process herein employed utilizes certain low temperature and other conditions throughout the fluorination, isolation and purification steps to minimize reactions between the higher perfluoroalkyl oxyfluoride products and any fragmentizing or decomposition agents present. The compounds can therefore be isolated in a state free from decomposition or fragmentation catalysts or initiators, so that these desired compounds are obtained in relatively stable, useful form.

Broadly speaking, the process of the invention consists in direct fluorination of compounds having a molecular structure in which at least one oxygen atom is directly linked to a carbon atom. The longest continuous directly oxygen-linked carbon chain of the starting compound can contain at least as many carbon atoms as are desired in the longest continuous chain directly linked to the OF group in the final product. However, it has been observed that coupling or combination of the carbon chains may occur in the process, so that carbon-containing chains longer than those of the starting materials are produced.

The starting materials can be more specifically represented by the formula:

$$R_S(O)$$

wherein (O) represents oxygen directly linked to carbon, and wherein $R_S$ represents a starting radical having from 1 to 18 carbon atoms in the longest chain thereof and may be a perfluoroalkyl radical as defined herein. These compounds are directly fluorinated under certain mild conditions at temperatures below about 50° C., to form compounds of the formula:

$$(R)_nC(F)_mOF$$

wherein R, m and n have the significance hereinabove described.

Examples of oxygen linked directly to carbon for the purpose of the invention include carbonyl, carboxyl, ester, orthoester, carbinol and the like linkages.

Preferably the metallic salt-forming compounds containing oxygen linkages of the type described are used as their salts; carboxyl group-containing compounds are always used as salts, to prepare the compounds of the invention. While fragmentation products such as $COF_2$, $CO_2$, and $C_2F_6$ are concomitantly produced in the process, these by-product compounds do not include catalysts or initiators for the complete decomposition of higher perfluoroalkyl oxyfluorides to fragmentation products. The compounds of the invention can thus be characterized as free from fragmentation initiators which cleave the fluorine from the —OF group.

An interesting sub-group of compounds according to the invention is that in which a peroxy group is present in the perfluoroalkyl chain. These compounds are represented by the formula:

$$X-R'_f-OO-R''_f-(OF)_n$$

wherein X is a member of the group consisting of fluorine and —OF; $R'_f$ is a divalent perfluoroalkyl radical; and $R''_f$ is a perfluoroalkyl radical, the total number of carbon atoms in $R'_f$ and $R''_f$ taken together being from 2 to 18, these radicals being straight or branched chain, and each having at least one carbon atom; and n is 1 or 2. These compounds have increased oxidizing power owing to the presence of peroxy group.

Illustrative compounds of this type include perfluoromethyl fluorooxydifluoromethyl peroxide $$(CF_3OOCF_2OF)$$

perfluoroisopropyl fluoroxydifluoromethyl peroxide $$(CF_3CF(CF_3)OOCF_2OF)$$

perfluoroethyl 1 - (1-fluoroxydifluoromethyl)tetrafluoroethyl peroxide ($C_2F_5OOCF(CF_3)CF_2OF$), fluoroxydifluoromethyl 1-fluoroxytetrafluoroethyl) peroxide $$(FOC_2F_4OOCF_2OF)$$

bis (1-fluoroxytetrafluoroethyl) peroxide $$(FOC_2F_4OOC_2F_4OF)$$

and the like.

The compounds of the invention are prepared by direct fluorination of oxygen-containing compounds in many cases having structures and substitutents corresponding to those desired in the final product. Thus, for example, the direct fluorination of perfluoro-t-butyl alcohol yields perfluoro-t-butyl oxyfluoride; direct fluorination of perfluorodipropyl ketone produces 4-fluoroxyperfluoroheptane; direct fluorination of hexafluoroacetone produces perfluoroisopropyl oxyfluoride as well as perfluoroethyl oxyfluoride, etc. As noted, however, some of the substituent groups can be formed in the fluorination process.

Illustrative of other useful starting materials are sodium nitrodifluoroacetate, polyvinyleneglycol, cyclopentanepentone hydrate, ethanol, alloxan, salts of perfluorosebacic acid; orthoesters of fluorocarbon monocarboxylic acids such as methyl orthoperfluorobutyrate and the like; dihydroperfluoroalkanols such as 1,1-dihydroperfluorobutanol, 1,1-dihydroperfluorododecanol, 1,1-dihydro-n-undecafluorohexanol and the like; alkyl hemiacetals of perfluoroalkyl aldehydes such as heptafluorobutyraldehyde ethylhemiacetal and the like; salts of monochloropropionic acid; salts of fluorocarbon acids such as perfluorohexanoic acid and perfluorodecanoic acid and the lower alkyl esters of these acids; salts of benzenehexacarboxylic acid; dipotassium salt of nitroacetic acid; fluoral hydrate; sodium fluorodichloroacetate; 3,4-diketocyclobuten-1,2-diol and its disodium salt, hexapotassium salt of hexahydroxybenzene; 2,2-dinitropropane-1,3-diol; mono- and dipotassium salts of nitromalonic acid; 2-chloro-2,3,3-trifluorobutane-1,4-diol; disodium salt of tetrafluorodiglycolic acid; dipotassium salt of rhodizonic acid; disodium salt of croconic acid; calcium salt of chloranilic acid; trisodium salt of trihydroxytrinitrosobenzene; monoxime of cyclopentanetrione; perfluoroisopropyl nitrite; disodium ketomalonate; calcium oxamate; 1,2-bis (difluoroamino)ethylene glycol; disodium salt of omega, omega, omega-trifluoroacetoacetic acid; 2-nitro-1,3-diketohydrindene; potassium salt of 5-nitroörotic acid; the reaction product of methyl trifluoroacetate and sodium methoxide; diethyl carbonate; and the like.

Where two oxygen atoms are attached to the same carbon atom, as in carboxylic acid salts, mixtures of the monofluoroxy- and difluoroxy-substituted compounds may result.

The desired products are isolated from the reaction mixtures by fractional condensation, employing traps cooled with Dry Ice, liquid air, ice-salt mixtures and the like where the products are low-boiling, and other appropriate temperature conditions where higher boiling liquids or solids are produced. The fluorine and other gases used are conveniently introduced under slight positive pressure. Preferably, the fluorine is diluted with nitrogen or other inert gas such as argon or helium, or a Freon, such as dichlorodifluoromethane and the like, to give concentrations upward of about 0.1%; but 100% fluorine in the gas stream, that is, undiluted fluorine, can be used in many of the procedures described, using great caution and slow addition. In working up the product, contact with agents which catalyze fragmentation is avoided.

Residual fluorine should always be flushed out of the reactants and the apparatus, using dry nitrogen or the like, to avoid unpleasant and toxic exposure to fluorine as well as untoward effects owing to the strong oxidizing power of this substance. The apparatus used is preferably constructed from Monel metal or copper. Solid, liquid or gaseous starting materials can be used. The reactant is placed in a suitable container with diluents or suspending media if desired and is then contacted with fluorine for a period ranging from about 10 minutes to about 6 to 12 hours and upwards, depending on the amount of starting material charged and the ease with which the fluorination is accomplished.

Generally speaking, once the process has gone to completion, no further fluorine reacts, so that when the products are volatile and thus are swept into the traps, continuation of the flow of fluorine is not deleterious; but in case of non-volatile solid or non-volatile liquid products excessive exposure to fluorine should be avoided to eliminate the possibility that degradative reactions may occur. Preferably, the reaction mixture is maintained at a temperature in the range of about −100° C. to 50° C. The temperature selected is maintained by cooling or heating the reactor vessel, as required.

If desired, an inert liquid suspending medium can be used to suspend the finely divided oxygen-containing reactant, and the fluorine gas with or without a diluent gas is then bubbled through the suspension. Inert solid diluents, such as finely divided sodium fluoride, can also be used. Thus, for example, fluorine-inert liquids such as perfluorinated hydrocarbons, e.g. perfluorooctanes, perfluorohexanes, and the like; perfluorocyclohexane; perfluorinated cyclic ethers such as perfluorobutylfuran; perfluorinated tertiary amines such as tris-perfluoro-n-butylamine; and the like can be used. Commercially obtainable fluorocarbons may contain an amount of material which is not inert toward fluorine, and in such cases, fluorine gas is passed through the selected fluorocarbon liquid for a time in small amounts just sufficient to render it substantially completely inert toward fluorine. When an inert liquid diluent is employed in the process of the invention, the hyperfluorinated reaction product generally dissolves in the diluent. In a similar manner, inert gases can be used as diluents for gaseous reactants.

In the procedure where no solvent is used, the effluent gas stream ordinarily contains the products, which are separated by traps as stated. Where solvent is employed, any insoluble material is removed by filtration and the product is recovered by evaporation of the solvent, preferably under reduced pressure. Fractionation may be necessary if separation of the products is desired. It should be noted that for some purposes, the reaction product mixture can be used as such.

Broadly speaking, the process of the invention is carried out by treating an oxygen-containing reactant compound as described herein with elemental fluorine. The process can be carried out at a temperature in the range of about −100° C. to about 50° C. The process is conducted in such a way as to avoid contact with or reaction with fragmentizing agents.

Separation of the products of reaction is accomplished by chromatographic techniques in small scale runs; in larger runs, other known methods of fractionation can be used. Crude or impure products are preferably stored well below room temperature, conveniently using solid carbon dioxide or liquid nitrogen, to minimize the deleterious action of fragmentizing agents. During the separation and purification of the products, the temperature is maintained at the minimum temperature at which movement of the products through the chromatographic apparatus takes place. Alternative separation and purification can be accomplished by the usual means, taking into consideration the strongly oxidizing, sometimes explosive nature of the products, and maintaining temperatures at a minimum.

The compounds of the invention are useful as oxidants, for example, for bleaching and the like; for oxidizing agents in chemical synthesis; combined with proper fuels and binders, as oxidizers in propellants and the like. They are especially useful in areas where fluorinated chains confer advantages owing to their special properties of solubility in fluorinated solvents and reduced solubility in other solvent systems.

The following specific examples will illustrate the process and products included within the scope of the invention. In these examples, all parts are by weight unless otherwise specified.

EXAMPLE 1

Nitrosyl trifluoroacetate, B.P. 47° C./94 mm., is subjected to fluorination as follows:

The fluorination of nitrosyl trifluoroacetate is carried out using a static bed procedure in a 450 cc. copper vessel of cylindrical shape, equipped with a gas inlet tube, a gas outlet tube, and a polychlorotrifluoroethylene rupture disc. A 1.0 g. sample of nitrosyl trifluoroacetate (about 7 millimoles) is placed in a stainless steel tray in the copper fluorinating vessel. The reactor is immersed in a cooling bath at −20° C. and flushed with a stream of dry prepurified nitrogen to displace air. Fluorine (commercially available, 95% pure) is introduced into the nitrogen stream (using Monel metal fittings). The fluorine-nitrogen mixture is passed into the vessel and the volatile, entrained products formed are recovered from the effluent stream, which is passed through an iron tube containing granular sodium fluoride at room temperature to remove hydrogen fluoride (which is present in commercial fluorine) and then through a trap immersed in liquid air. A stream of about 3% (by volume) fluorine in nitrogen is passed through the reactor at a flow rate of about .02 cubic ft./min. for seven hours (a total of 0.20 mole of fluorine). The fluorine flow is then discontinued and the cooling bath removed; the reaction vessel is thereafter purged with nitrogen for ½ hour.

The contents of the liquid air trap are maintained at liquid air temperatures until they are worked up as follows: The non-condensable gases are removed from the trap at liquid air temperature under reduced pressure, and the condensate then allowed to warm slowly while it is fractionated at about 1 mm. pressure through the traps designated A, B and C, successively. Trap A is cooled in a solid carbon dioxide-trichloroethylene bath at about −78° C., trap B in a bromoethane slush bath at about −119° C. and trap C in liquid nitrogen at about −196° C. Trap C is found to contain about 2 millimoles of products, including pentafluoroethyl oxyfluoride. These products are kept at liquid air temperature until separated and purified. Pentafluoroethyl oxyfluoride is isolated in pure form from the mixture by means of vapor phase chromatography. For this process a column 8′7″ in length and ½″ in diameter packed with perfluorotributylamine (33%) coated on 30–60 mesh acid-washed filter aid (diatomaceous earth) (67%) and maintained at about −30° C. was used. An 8-volt thermistor was used as the detector. Helium was employed as the carrier gas at a flow rate of 320 ml./min. Pentafluoroethyl oxyfluoride is thus obtained. The yield of pure, pentafluoroethyl oxyfluoride thus obtained is about 16% of theoretical based on the amount of nitrosyl trifluoroacetate used.

The $F^{19}$ nuclear magnetic resonance spectrum of pentafluoroethyl oxyfluoride contains an absorption at −139.4$\phi$, which is assigned to the OF group. This absorption is split into a six-fold peak (in the relationship 1, 5, 10, 10, 5, 1, three superimposed quadruplets). Other absorptions are observed at 82.1$\phi$ for the $CF_3$ group and 97.9$\phi$ for the $CF_2$ group. The infrared spectrum of this material shows an absorption at 11.15 microns, which is assigned to the fluoroxy group.

Perfluoroethyl oxyfluoride is very stable when free from agents which cause fragmentation. A sample of such material which stood at room temperature for eleven months underwent essentially no decomposition. Differential thermal analysis studies appear to indicate that the compound undergoes smooth decomposition between 110 an 200° C. Pentafluoroethyl oxyfluoride can be water-washed for periods up to 1 hour with no evidence of hydrolysis. An analytical data on a sample of chromatographed pentafluoroethyl oxyfluoride were as follows.

Calculated for $C_2F_6O$: C, 15.6; F, 74.0. Found: C, 15.6; F, 74.9.

A molecular weight determination on this material gave a value of 148; the calculated value is 154. The sample was found to have an oxidizing power of 12.34 milliequivalents of iodine per gram (calculated for 2-electron change, 13.0).

EXAMPLE 2

Hexafluoroacetone hydrate is prepared by the aqueous permanganate oxidation of perfluoroisobutylene according to the procedure of Moore et al., Can. J. Chem., 33, 453 (1955). The crude product, boiling at 55–56° C. at 80 mm., is used directly in the fluorinaiton reaction. It contains about 75% hexafluoroacetone hydrate and also some diethyl ether and water.

A static bed procedure as described in Example 1 is used. A 4.0 g. sample of hexafluoroacetone hydrate (about 17 millimoles) is placed in a copper tray in the 450 cc. cylindrical copper vessel. The reactor is immersed in a cooling bath at about −20° C. and flushed with a stream of dry purified nitrogen to displace the air contained therein. Fluorine is introduced into the nitrogen stream and the fluorine-nitrogen mixture is passed into the vessel. The volatile, entrained products formed are recovered from the effluent stream, which is passed through an iron tube containing granular sodium fluoride at room temperature to remove hydrogen fluoride and then through a trap immersed in liquid air. During the first hour a 3% (by volume) stream of fluorine in nitrogen is passed through the reactor at a rate of about .02 cubic ft./min. During the second hour a concentration of about 15% fluorine is passed through the reactor at a flow rate of about .01 cubic ft./min. The cooling bath is removed and the reaction mixture is allowed to warm to room temperature, while the 15% fluorine stream is continued for two more hours. After four hours, during which a total of 0.26 mole of fluorine is used, the fluorine flow is discontinued; the reaction vessel is then purged with nitrogen for one-half hour.

The contents of the liquid air trap are stored at liquid air temperature until work up, which is as follows: With the trap maintained at liquid air temperature the non-condensable gases (chiefly nitrogen) are removed under reduced pressure, and the condensate is then allowed to warm slowly while it is fractionated at about 1 mm. pressure through traps designated A, B and C, successively. Trap A is cooled in a solid carbon dioxide-trichloroethylene bath at about −78° C., trap B in a bromoethane slush bath at about −119° C. and trap C in liquid nitrogen at about −196° C. Trap B is found to contain about 11 millimoles of gaseous products of which at least 6 millimoles are oxyfluorides. The oxyfluoride present in largest amount is found to be heptafluoroisopropyl oxyfluoride, while pentafluoroethyl oxyfluoride is also contained in the mixture. The contents of trap B have an oxidizing power of 5.8 milliequivalents of iodine per gram of sample.

The fluoroxy compounds thus produced are concentrated by washing the crude mixture with water for 5–15 minutes. The mixture is stored at liquid air temperature until such time as the individual compounds are isolated in pure form by vapor phase chromatography. Heptafloroisopropyl oxyfluoride is thus obtained and also pentafluoroethyl oxyfluoride.

Heptafluoroisopropyl oxyfluoride and pentafluoroethyl oxyfluoride are colorless gases which boil below room temperature. The $F^{19}$ nuclear magnetic resonance spectrum of heptafluoroisopropyl oxyfluoride contains an absorption at $-154.1\phi$, which has been assigned to the OF group. This absorption is split into two seven-fold peaks corresponding to the splitting from the CF and $(CF_3)_2$ structures. Other absorptions are observed at $137.4\phi$ (two seven-fold peaks) for the CF group and at $75.5\phi$ (double doublet) for the perfluoromethyl groups. The infrared spectrum of heptafluoroisopropyl oxyfluoride contains an absorption at 11.3 microns which is assigned to the fluoroxy group.

Analytical data were obtained on a sample of heptafluoroisopropyl oxyfluoride which was diluted with nitrogen gas.

*Analysis.*—Calculated for $C_3F_8O$ containing 45.0% $N_2$: C, 7.9; F, 33.5. Found: C, 8.2; F, 33.0.

EXAMPLE 3

The sodium salt of nonafluoro-t-butyl alcohol is fluorinated by the static bed procedure in a cylindrical copper vessel as set forth above. A 1.1 g. sample of the sodium salt of nonafluoro-t-butyl alcohol (about 4.4 millimoles) is placed in a copper tray in the fluorinating vessel. The reactor is immersed in a cooling bath at −20° C. and flushed with nitrogen; then fluorine is introduced into the nitrogen stream and the mixture is passed into the vessel. The effluent stream is passed through an iron tube containing sodium fluoride at room temperature to remove hydrogen fluoride and then through a trap immersed in liquid air. A stream of 5% (by volume) fluorine in nitrogen is passed through the reactor at a flow rate of about .02 cubic ft./min. for 2.5 hours (a total of .12 mole of fluorine). The fluorine flow is then discontinued and the cooling bath removed; the reaction vessel is thereafter purged with nitrogen for ½ hour.

The liquid air trap is found to contain 2.3 millimoles of nonafluoro-t-butyl oxyfluoride of about 95% purity. This material is isolated in pure form by chromatography by the procedure described previously.

The $F^{19}$ nuclear magnetic resonance spectrum of nonafluoro-t-butyl oxyfluoride displays an absorption at $-149.6\phi$, which is split into a 10-fold peak by the perfluoromethyl groups. A second absorption (a doublet) is observed at $69.5\phi$ for the $CF_3$ groups. The infrared spectrum of nonafluoro-t-butyl oxyfluoride contains an absorption at 11.3 microns, which is assigned to the oxyfluoride group. Elemental analysis of a sample of chromatographed nonafluoro-t-butyl oxyfluoride gave the following values:

*Analysis.*—Calcd. for $C_4F_{10}O$: C, 18.9; F, 74.8. Found: C, 18.9; F, 74.4.

A molecular weight determination on this material gave a value of 252; the calculated value is 254. It has an oxidizing power of 4.03 milliequivalents of iodine per gram (calculated for one-electron change, 3.93); in acidic ammonium molybdate medium the oxidizing power is 7.34 milliequivalents per gram (calculated for two-electron change, 7.87). Nonafluoro-t-butyl oxyfluoride is found to be relatively stable. A purified sample, about 95% pure, which stood at room temperature for seven weeks underwent only about 5% decomposition. It does not react readily with water or acid; 98% sulfuric acid, for example, brought about less than 5% hydrolysis in 2 hours.

EXAMPLE 4

The sodium salt of undecafluorohexanoic acid (sodium perfluorocaproate, $C_5F_{11}CO_2Na$) is fluorinated in a cylindrical copper vessel as described above. A 1.02 g. sample of the sodium salt (about 3.0 millimoles) is placed in a copper tray in the fluorinating vessel. The reactor is flushed with nitrogen, and fluorine is introduced into the nitrogen stream. The effluent stream is passed through an iron tube containing sodium fluoride at room temperature, and then through a trap immersed in liquid air. A stream of about 5% (by volume) of fluorine in nitrogen is passed through the reactor at a flow rate of .02 cubic ft./min. for ½ hour, an 11% stream of fluorine at a flow rate of .008 cubic ft./min. for ½ hour, and a 23% stream of fluorine at a flow rate of .01 cubic ft./min. for 3 hours. During this 4 hour reaction period a total of 0.41 mole of fluorine is introduced into the reactor; the temperature inside the reactor is 17° C. The fluorine flow is discontinued and the reaction vessel is then purged with nitrogen for ½ hour. The residual material in the reactor is found to weigh about 0.17 g.

The contents of the liquid air trap are worked up as follows: The non-condensable gases are removed from the trap at liquid air temperature under reduced pressure, and the condensate then allowed to warm slowly while it is fractionated at about 0.1 mm. pressure through traps designated A and B. Trap A is cooled in solid liquid slurry of bromoethane (−119° C.), and Trap B in liquid nitrogen (−196° C.). Trap A is found to contain about ½ cc. of liquid perfluorohexyl oxyfluorides which are strongly oxidizing toward potassium iodide and toward ferrocene. The infrared spectrum of this material shows a characteristic peak at about 11.1 microns; the $F^{19}$ nuclear magnetic resonance spectrum contains a peak at $-143\phi$ which is assigned to OF groups.

EXAMPLE 5

Sodium chlorodifluoroacetate ($ClCF_2CO_2Na$) containing about 50% sodium trifluoroacetate is fluorinated by the static bed procedure in a 1550 cc. cylindrical copper vessel, equipped with a gas inlet tube, a gas outlet tube, and a lead rupture disc. A 1.9 g. sample of the mixed salt described above (about 6 millimoles of sodium chlorodifluoroacetate) is placed in a copper tray in the fluorinated vessel. The reactor is flushed with a stream of nitrogen, and fluorine is introduced into the nitrogen stream. The volatile reaction products are passed through an iron tube containing sodium fluoride at room temperature and then through a trap immersed in liquid air. A stream of about 5% (by volume) of fluorine in nitrogen is passed through the reactor at a flow rate of .02 cubic ft./min. for 15 minutes, a 23% stream at a flow rate of .01 cubic ft./min. for 15 minutes, and a 56% stream at a flow rate of .007 cubic ft./min. for 3 hours. During this 3½ hour reaction period a total of 0.68 mole of fluorine is introduced into the reactor; the temperature inside the reactor is 20 °C. The fluorine flow is discontinued and the reaction vessel is then purged with nitrogen for ½ hour. The residual material in the reactor is found to weigh 0.8 g.

The liquid air trap is found to contain about 6.8 millimoles of condensed products. The condensate is fractionated at about 0.1 mm. pressure through traps designated A and B. Trap A is cooled in a bromoethane slush bath ($-119°$ C.) and trap B in liquid nitrogen ($-196°$ C.). 2-chloroethyltetrafluoroethyl oxyfluoride is isolated in pure form from this fraction by vapor phase chromatography as described previously. Analytical data on a sample of the chromatographed material were as follows.

Calculated for $C_2F_5OCl$: C, 14.1; F, 55.7. Found: C, 14.0; F, 56.0.

The $F^{19}$ nuclear magnetic resonance spectrum of 2-chlorotetrafluoroethyl oxyfluoride contains an absorption at $-140.2\phi$, which is assigned to the OF group. This absorption is split into a triplet by the adjacent $CF_2$ group. Other absorptions are observed at $95.9\phi$ for the $CF_2$ group attached to the OF group and at $69.3\phi$ for the $CF_2$ group attached to the chlorine atom. The infrared spectrum of 2-chlorotetrafluoroethyl oxyfluoride contains characteristic absorption peaks in the 11.0–11.6 region.

EXAMPLE 6

The sodium salt of nonadecafluorodecanoic acid is fluorinated by the static bed procedure as described previously. A 0.93 g. sample of the sodium salt (about 2.8 millimoles) is placed in a copper tray in the fluorinating vessel and is subjected to the following fluorination treatment at 18° C.:

15 minutes, 5% fluorine, .02 cubic ft./min. gas flow rate
30 minutes, 11% fluorine, .008 cubic ft./min. gas flow rate
2.5 hours, 23% fluorine, .01 cubic ft./min. gas flow rate A total of 0.34 mole of fluorine is introduced into the reactor in this period. The residual material in the reactor is found to weigh about 0.15 g. and to consist mainly of $NaHF_2$.

The contents of the liquid air trap are worked up as follows: The non-condensable gases are removed from the trap at liquid air temperature under reduced pressure, and the condensate then allowed to warm slowly while it is fractionated at about 0.1 mm. pressure through traps designated A and B. Trap A is cooled in solid carbon dioxide-trichloroethylene ($-78°$ C.) and trap B in liquid nitrogen ($-196°$ C.). Trap A is found to contain about 250 mg. of a liquid which proved to be strongly oxidizing toward potassium iodide and toward ferrocene. The infrared spectrum shows absorptions at 11.1 and 11.3 microns which are in the region characteristic of OF groups. The product contains a mixture of mono- and di-fluoroxy-substituted perfluorodecanes.

EXAMPLE 7

Tetraethyl orthocarbonate is fluorinated in a cylindrical copper vessel, equipped with a gas inlet tube, a gas outlet tube, and a polytrifluorochloroethylene rupture disc. A 3.0 g. sample of tetraethyl orthocarbonate is placed in a copper tray in the fluorinating vessel. The reactor is immersed in a cooling bath at $-15$ to $-20°$ C. and flushed with nitrogen; fluoride is introduced into the nitrogen stream and the mixture is passed into the vessel. The effluent stream is passed through an iron tube containing sodium fluoride at room temperature to remove hydrogen fluoride and then through a trap immersed in liquid air. A stream of 15% (by volume) fluorine is passed through the reactor at a flow rate of .003 cubic ft./min. The fluorine flow is discontinued after a total of .39 mole of fluorine has been used, and the reaction vessel is purged with nitrogen.

The contents of the liquid air trap are worked up as follows: The non-condensable gases are removed from the trap at liquid air temperature under reduced pressure, and the condensate then allowed to warm slowly while it is fractionated at about .05 mm. pressure through traps designated A and B. Trap A is cooled in a fluorotrichloromethane slush bath ($-111°$ C.) and trap B in liquid nitrogen ($-196°$ C.). The mixture in trap B is found to contain pentafluoroethyl oxyfluoride. This compound is isolated in pure form by means of vapor phase chromatography by the procedure described previously.

EXAMPLE 8

Nonafluoro-t-butyl alcohol is also directly fluorinated by the static bed procedure described previously to yield nonafluoro-t-butyl oxyfluoride. An 0.9 g. sample of the alcohol (about 3.7 millimoles) is treated at about $-20°$ C. with 0.12 mole of fluorine delivered over a five-hour period at a concentration of 5% in nitrogen and a flow rate of .02 cubic ft./min. to give 1.7 millimoles of nonafluoro-t-butyl oxyfluoride.

EXAMPLE 9

The sodium salt of pentafluoropropionic acid is fluorinated by the static bed procedure in a copper vessel as described previously. A 1.2 g. sample of sodium pentafluoropropionate (about 6.5 millimoles) is placed in a copper tray in the fluorinating vessel. The reactor is flushed with nitrogen for 30 minutes at a flow rate of 0.02 cubic ft./min. Fluorine is introduced into the nitrogen stream and the mixture is passed into the vessel. The effluent stream is passed through an iron tube containing sodium fluoride at room temperature to remove hydrogen fluoride (present in commercially available fluorine) and then through a trap immersed in a liquid air bath. A stream of about 4% (by volume) of fluorine in nitrogen is passed through the reactor at a flow rate of 0.01 cubic ft./min. for 1 hour and then a 10% fluorine stream at a flow rate of 0.02 cubic ft./min. for 1 hour and then a 20% fluorine stream at a flow rate of 0.01 cubic ft./min. for 2 hours. During this four-hour reaction period a total of 0.29 mole of fluorine is introduced into the reactor; the temperature as measured by a thermocouple inside the reactor remains constant at approximately 21° C. The fluorine flow is discontinued and the reaction vessel is then purged with nitrogen at a flow rate of 0.01 cubic ft./min. for ½ hour. The residual material in the reactor is found to weigh 0.32 g.; it consists principally of $NaHF_2$ and NaF. The contents of the liquid air trap are transferred to a vacuum line in order to remove non-condensable gases and found to contain 4.7 millimoles of condensed products. The products are recondensed at $-190°$ C. and the condensate then allowed to warm slowly while it is fractionated at less than 0.1 mm. pressure through successive traps kept at $-78°$ C., $-119°$ C., $-140°$ to −196° C., respectively, by using appropriate cold baths around the traps. The −119° C. fraction is largely heptafluoro-n-propyl oxyfluoride (approximately 35% yield). Some pentafluoroethyl oxyfluoride is also formed. Acyl fluorides present in the products are usually removed prior to fractionation by hydrolysis using distilled water. Heptafluoro-n-propyl oxyfluoride is isolated in pure form from this fraction by vapor phase chromatography as described previously. The column is maintained at 0° C. to speed the elution of heptafluoro-n-propyl oxyfluoride.

The $F^{19}$ nuclear magnetic resonance spectrum of heptafluoro-n-propyl oxyfluoride contains an absorption at −144.3$\phi$, which is assigned to the OF group. Other absorptions are observed at +93.9$\phi$ for the $CF_2$ group attached to the fluoroxy (OF) group, at 127.0$\phi$ for the next adjacent $CF_2$ group, and at +82.5$\phi$ for the $CF_3$ group. The infrared spectrum of perfluoro-n-propyl oxyfluoride contains a characteristic absorption band at 11.25 microns which is in the usual O–F stretching region.

Heptafluoro-n-propyl oxyfluoride rapidly oxidizes ferrocene to the ferricinium ion; hexafluoroethane and carbonyl fluoride are also observed as products in this reaction. Hexafluoroethane and carbonyl fluoride are also observed as products when a sample of heptafluoro-n-propyl oxyfluoride is heated.

EXAMPLE 10

The sodium salt of trifluoroacetic acid is fluorinated by the static bed procedure in a copper vessel as described above. A 1.4 g. sample of sodium trifluoroacetate (about 10.5 millimoles) is placed in a copper tray in the fluorinating vessel. The reactor is flushed with nitrogen. Fluorine is introduced into the nitrogen stream and the mixture is passed into the vessel. The effluent stream is passed through an iron tube containing sodium fluoride at room temperature to remove hydrogen fluoride (which is present in commercial fluorine) and then through a trap immersed in liquid air. A stream of about 5% (by volume) of fluorine in nitrogen is passed through the reactor at a flow rate of .02 cubic ft./min. for ½ hour and then a 10% stream at a flow rate of .007 cubic ft./min. for 5 hours. During this 5½ hour reaction period a total of 0.27 mole of fluorine is introduced into the reactor; the temperature inside the reactor varies from 15–19° C. The fluorine flow is discontinued and the reaction vessel is then purged with nitrogen for ½ hour. The residual material in the reactor is found to weigh about 0.5 g.; it consists principally of $NaHF_2$ and NaF.

The liquid air trap is found to contain 4.8 millimoles of condensed products. This mixture is chromatographed by the procedure described previously. It is found to contain about 23% pentafluoroethyl oxyfluoride, 18% 1,1-bis(fluoroxy)tetrafluoroethane, and also an amount of bis(fluoroxy)difluoromethane.

EXAMPLE 11

The sodium salt of trifluoroacetic acid is fluorinated by the static bed procedure in a brass rectangular-shaped box reactor having a sintered Monel plate suspended across it. The vessel is equipped with a gas inlet tube below the sintered plate and a gas outlet tube and brass blow-out cap above it. A 2.1 g. sample of sodium trifluoroacetate (about 15.6 millimoles) is spread out on the sintered plate in the fluorinating vessel. The reactor is flushed with nitrogen, fluorine is introduced into the nitrogen stream, and the mixture is passed into the vessel. The effluent stream is passed through an iron tube containing sodium fluoride at room temperature to remove any hydrogen fluoride and then through a trap immersed in liquid air. A stream of about 4% (by volume) of fluorine in nitrogen is passed through the reactor at a flow rate of 0.01 cubic ft./min. for 15 minutes, then a 20% stream at a flow rate of .007 cubic ft./min. for 1 hour, and finally a 34% stream at a flow rate of .004 cubic ft./min. for 2 hours. During this 3½ hour reaction period a total of 0.30 mole of fluorine is introduced into the reactor; the temperature inside the reactor varies from 17–22° C. The fluorine flow is discontinued and the reaction vessel is then purged with nitrogen for ½ hour. The residual material in the reactor is found to weigh about 0.6 g.; it consists principally of $NaHF_2$ and NaF.

The liquid air trap is found to contain 9.3 millimoles of condensed products. This mixture is chromatographed by the procedure described previously. In addition to perfluoroethyl oxyfluoride, 1,1-bis(fluoroxy)tetrafluoroethane and bis(fluoroxy)difluoromethane, described above, the mixture contains a number of fluoroxy-peroxy compounds containing both —OF and —OO— groups, which are formed by coupling or combination of carbon-containing radicals. The column is maintained at 0° C. to speed the elution of the various higher boiling fluoroxy-peroxy compounds. These compounds are recovered as fractions having different retention times, in the usual way. They are conveniently identified by their nuclear magnetic resonance characteristics. Nuclear magetic resonance data characterizing four examples of fluoroxy-peroxy compounds containing one OF group per molecule as well as two examples of fluoroxy-peroxy compounds containing one OF group on each of two different carbon atoms in the molecule are presented below:

(1) The $F^{19}$ nuclear magnetic resonance spectrum of perfluoroethyl fluoroxydifluoromethyl peroxide contains an absorption at −157$\phi$, which is assigned to the OF group. Other absorptions are observed at 80$\phi$ for the adjacent $CF_2$ group, which is attached to another $CF_2$ group (asborption at 95$\phi$) by means of a peroxide linkage. The $CF_3$ group absorbs at 83$\phi$.

(2) The $F^{19}$ nuclear magnetic resonance spectrum of perfluoromethyl fluoroxydifluoromethyl peroxide contains an absorption at about −158$\phi$, which is assigned to the OF group. Other absorptions are observed at 80$\phi$ for the adjacent $CF_2$ group and 69$\phi$ for the $CF_3$ group.

(3) The $F^{19}$ nuclear magnetic resonance spectrum of perfluoroethyl 1-fluoroxytetrafluoroethyl peroxide contains an absorption at −148$\phi$, which is assigned to the OF group. Other absorptions are observed at 110$\phi$ for the CF group, 78$\phi$ for the $CF_3$ group attached to the CF group, 95$\phi$ for the $CF_2$ group and 83$\phi$ for the $CF_3$ group of the perfluoroethyl group.

(4) The $F^{19}$ nuclear magnetic resonance spectrum of perfluoromethyl 1-fluoroxytetrafluoroethyl peroxide contains an absorption at −147.5$\phi$, which is assigned to the OF group. Other absorptions are observed at 110.5$\phi$ for the CF group, 78.5$\phi$ for the $CF_3$ group attached to the CF group, and 69$\phi$ for the $CF_3$ group attached to the peroxide group.

(5) The $F^{19}$ nuclear magnetic resonance spectrum of fluoroxydifluoromethyl 1-fluoroxytetrafluoroethyl peroxide contains absorptions at −157$\phi$ and −148$\phi$, which are assigned to the OF groups attached to $CF_2$ and CF, respectively. Other absorptions are observed at 80$\phi$ for the $CF_2$ group, 110$\phi$ for the CF group and 78$\phi$ for the $CF_3$ group.

(6) The $F^{19}$ nuclear magnetic resonance spectrum of bis(1-fluoroxytetrafluoroethyl) peroxide contains an absorption at −149$\phi$, which is assigned to the two identical OF groups. Other absorptions are at 110$\phi$ for the CF groups and 78$\phi$ for the $CF_3$ groups.

These fluoroxy-peroxy compounds can be stored at room temperature for several months without extensive decomposition. They are strong oxidizing agents toward mercury, aqueous potassium iodide solution and ferrocene.

EXAMPLE 12

The sodium methoxide adduct to methyl trifluoroacetate is prepared by the method of Holm, U.S. Patent 2,611,787. The reaction product is evaporated to dryness and used directly in the fluorination.

A 1.0 g. sample of sodium dimethyl orthotrifluoroacetate, the adduct described above, is fluorinated by the static bed procedure in a 450 cc. cylindrical copper vessel, equipped with a gas inlet tube, a gas outlet tube, and a polychlorotrifluoroethylene rupture disc. After the sample is placed in a copper tray in the fluorinating vessel, the reactor is immersed in a cooling bath at about −70° C. The reactor is flushed with a stream of nitrogen, fluorine is introduced into the nitrogen stream, and the fluorine-nitrogen mixture is passed into the vessel. The volatile reaction products are passed through an iron tube containing sodium fluoride at room temperature and then through a trap immersed in liquid air. A stream of 2% (by volume) fluorine in nitrogen is passed through the reactor at a rate of about .02 cubic ft./min. for 4 hours. After 2 hours the temperature of the bath is raised to about −50° C. and the reaction continued at this temperature for the remainder of the 4 hour period. With the bath still at −50° C., the fluorination treatment is continued by passing a 3% fluorine stream through the reactor at a flow rate of .02 cubic ft./min. for 0.5 hour, a 4% stream at a flow rate of .01 cubic ft./min. for 0.5 hour, a 6% stream at a flow rate of .008 cubic ft./min. for 0.5 hour, and a 12% stream at a flow rate of .009 cubic ft./min. for 0.7 hour. A total of 0.19 mole of fluorine is thus introduced into the reactor. The crude products formed are stored well below room temperature.

The condensate in the liquid air trap is fractionated at less than 1 mm. pressure through traps A and B. Trap A is cooled in a slush bath composed of a mixture of trifluorochloromethane, chloroform, and carbon tetrachloride, having a temperature of about −88° C., and trap B in liquid nitrogen at about −196° C. Trap A is found to contain 1.0 millimole of products, which include pentafluoroethyl oxyfluoride, bis(fluoroxy)difluoromethane, and 1,1-bis(fluoroxy)tetrafluoroethane. Trap B is found to contain bis(1-fluoroxy-tetrafluoroethyl)peroxide.

EXAMPLE 13

1,1,1-trichloro-3-nitro-2-propanol is fluorinated by the static bed procedure in a 450 cc. cylindrical copper vessel, equipped with a gas inlet tube, a gas outlet tube, and a polychlorotrifluoroethylene rupture disc. A 3.0 g. sample is placed in a copper tray in the fluorinating vessel. The reactor is flushed with a stream of nitrogen, and fluorine is introduced into the nitrogen stream. The volatile reaction products are passed through an iron tube containing sodium fluoride at room temperature and then through a trap immersed in liquid air. A stream of about 4% (by volume) fluorine in nitrogen is passed through the reactor at a flow rate of .02 cubic ft./min. for 2.5 hours, an 11% stream at a flow rate of .02 cubic ft./min. for 1.5 hours, a 25% stream at a flow rate of .02 cubic ft./min. for 1.5 hours, and a 41% stream at a flow rate of .01 cubic ft./min. for 2.5 hours. A total of 1.3 moles of fluorine is introduced into the reactor; the temperature inside the reactor is 20° C. At the end of the 8 hour reaction period the fluorine flow is discontinued and the reaction vessel is purged with nitrogen for 1 hour. The crude products are stored well below room temperature.

The condensate in the liquid air trap is fractionated at less than 1 mm. pressure through traps A, B and C. Trap A is coiled in a solid carbon dioxide-trichloroethylene bath at about −78° C., trap B in a trifluorochloromethane slush bath at about −111° C. and trap C in liquid nitrogen at about −196° C. Trap A is found to contain about 0.9 millimole of products and trap B is found to contain about 0.4 millimole of products. Both of these fractions are found to contain 2-nitrotetrafluoroethyl oxyfluoride. Trap A is also found to contain other oxyfluoride compounds.

The infrared spectrum of 2-nitrotetrafluoroethyl oxyfluoride shows one strong absorption at about 6.1 microns, which is assigned to the nitro group, and another at about 11.15 microns due to the OF group. The F$^{19}$ nuclear magnetic resonance spectrum of this compound shows an absorption at −150.5φ for the OF group, one at 93.4φ for the CF$_2$ attached to OF, and one at 98.8φ for the CF$_2$ attached to the nitro group. No decomposition of a sample of this compound stored at room temperature for 6 days was observed.

EXAMPLE 14

2-hydroxy - 2 - trichloromethyl-1,3-dioxane having the formula

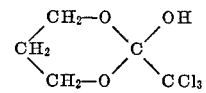

is prepared by the dropwise addition of trichloroacetyl chloride to a stirred suspension of 1,3-propanediol in dry ether, as described by Hibbert and Greig, Can. J. Res., 4, 254 (1931). The residual liquid remaining after ether and hydrogen chloride are removed by evaporation under vacuum is used directly in the fluorination reaction.

The fluorination is carried out in a brass rectangularly-shaped box reactor having a sintered Monel plate suspended across it. The vessel is equipped with a gas inlet tube below the sintered plate and a gas outlet tube and brass blow-out cap above it. A 2.0 g. sample of 2-hydroxy-2-trichloromethyl-1,3-dioxane is spread out on the sintered plate in the fluorinating vessel. The reaction is carried out over a 4-day period. On the first day, the reactor is immersed in a cooling bath at about −70° C., flushed with nitrogen, fluorine is introduced into the nitrogen stream, and the gas mixture is passed into the vessel. The effluent stream is passed through an iron tube containing sodium fluoride at room temperature to remove hydrogen fluoride and then through a trap immersed in liquid air to recover the volatile, entrained products. A stream of 3% (by volume) of fluorine in nitrogen is passed through the reactor at a flow rate of .02 cubic ft./min. for 7 hours. After 4 hours the temperature of the bath is raised to about −50° C. and the process continued at that temperature for the remainder of the 7 hour period. The reactor is purged with nitrogen for 1 hour, while being allowed to warm to room temperature, and the trap containing the volatile products is removed. The reactor is capped and allowed to stand overnight. On the second day, a new trap is connected to the exit line beyond the sodium fluoride scrubber. The reactor is immersed in a cooling bath at about −50° C. and a stream of 7% (by volume) fluorine in nitrogen is passed through the reactor at a rate of about .007 cubic ft./min. for 2 hours. For the following 5 hours, a concentration of 20% and a flow rate of about .008 cubic ft./min. are maintained. After 2 hours at this concentration, the temperature of the cooling bath is raised to −20° C. and the process is continued at that temperature for the remainder of the 7 hour period. The reactor is purged with nitrogen for 1 hour, while being allowed to warm to room temperature, and the trap containing the volatile products is then removed.

The reactor is capped and allowed to stand at room temperature overnight. On the third day, a new trap is connected to the exit line immediately following the sodium fluoride scrubber. The reactor is immersed in a cooling bath at about 0° C. and a stream of about 11% (by volume) fluorine in nitrogen is passed through the reactor at a rate of about .02 cubic ft./min. for 2 hours. For the next 5 hours a concentration of about 20% and a flow rate of about .008 cubic ft./min. are maintained. After 3 hours the cooling bath is removed and the reaction vessel is allowed to warm to room temperature (about 20° C.); the fluorination gas stream is continued during the warming and for the remainder of the 5 hour period. The reactor is purged with nitrogen for 1 hour, after which the trap containing the volatile products is removed. The reactor is capped and allowed to stand overnight. On the fourth day, a new trap is connected to the exit line beyond the sodium fluoride scrubber. A stream of 24% (by volume) fluorine in nitrogen is passed through the reactor at a rate of about .02 cubic ft./min. for 1 hour.

For the next 6 hours a concentration of about 36% (by volume) fluorine in nitrogen and a flow rate of .01 cubic ft./min. are maintained. After 1 hour at this concentration the temperature is raised to about 38° C. and maintained there for the remainder of the 6 hour period. The reactor is purged with nitrogen for 1 hour, while it is allowed to cool to room temperature. A total of 2.50 moles of fluorine is introduced into the reactor during the 4 day period.

Only a very small quantity of volatile products is formed on the first and second days. A somewhat larger quantity is obtained on the third day, but the major proportion of the products is obtained on the fourth day. The crude products are stored well below room temperature. The products of the fourth day are removed from the trap at liquid air temperature under reduced pressure, and fractionated at about 1 mm. pressure through the traps A (−78° C.), B (−111° C.) and C (−196° C.), successively. Trap A is found to contain more than 1.8 millimoles of products, which include 2,2,2-trichloro-1,1-difluoroethyl oxyfluoride, 2,2-dichloro-1,1,2-trifluoroethyl oxyfluoride, 1,3-bis(fluoroxy)hexafluoropropane and 3-fluoroxytetrafluoropropionyl fluoride. Trap B is found to contain about 0.8 millimole of products, including 1,3-bis(fluoroxy)hexafluoropropane, 3 - fluoroxytetrafluoropropionyl fluoride, 2,2-dichloro-1,1,2-trifluoroethyl oxyfluoride, 2-chlorotetrafluoroethyl oxyfluoride, and pentafluoroethyl oxyfluoride. Trap C is found to contain about 4.8 millimoles of products, including carbon dioxide, carbonyl fluoride and pentafluoroethyl oxyfluoride. The pure oxyfluorides are isolated from these mixtures by vapor phase chromatography.

2,2,2,-trichloro-1,1-difluoroethyl oxyfluoride is a liquid at room temperature. The F$^{19}$ nuclear magnetic resonance spectrum of this compound displays an absorption at −141.8$\phi$, which is split into a triplet by the CF$_2$ group. A second absorption is observed at 91.6$\phi$ for the CF$_2$ group.

2,2-dichloro-1,1,2-trifluoroethyl oxyfluoride is a liquid at room temperature. The F$^{19}$ liquid magnetic resonance spectrum of this compound contains a peak at −141.6$\phi$, which is split into a quadruplet by the three fluorines on carbon. Also shown are peaks at 93.7$\phi$, a double doublet due to the CF$_2$ group, and at 71.8$\phi$, a double triplet assigned to the CF group.

The infrared spectrum of 1,3-bis(fluoroxy)hexafluoropropane contains an absorption at 11.3 microns, which is assigned to the OF group. The F$^{19}$ nuclear magnetic resonance spectrum of this compound shows a broad absorption at −146.6$\phi$, which is assigned to the OF group. Other absorptions occur at 93.4$\phi$ for the CF$_2$ groups adjacent to the OF groups and at 122.8$\phi$ for the center CF$_2$ group. Both of these absorptions are also broad. This compound was not found to undergo any decomposition on standing 17 days at room temperature.

3-fluoroxytetrafluoropropionyl fluoride exhibits an absorption in the N.M.R. spectrum at −144.4$\phi$, due to the OF group. The fluorine atom of the acid fluoride group absorbs at −22.9$\phi$, the CF$_2$ adjacent to it at 118.3$\phi$ and the other CF$_2$ group at 94.8$\phi$. This compound was not found to undergo any decomposition during a 22-day period at room temperature.

EXAMPLE 15

Commercially available alloxan (3.0 g., about 18.8 millimoles) is fluorinated by the static bed procedure as described earlier under the following conditions:

11° C. (1.0 hr.), 6% fluorine, .01 cubic ft./min. gas flow rate

11° C. (1.0 hr.), 12% fluorine, .10 cubic ft./min. gas flow rate

14° C. (2.0 hrs.), 40% fluorine, .005 cubic ft./min. gas flow rate

A total of 0.87 mole of fluorine is introduced into the reaction vessel in this period.

The contents of the liquid air trap are worked up as follows: The non-condensable gases are removed from the trap at liquid air temperature under reduced pressure, and the condensate then allowed to warm slowly while it is fractionated at about 1 mm. pressure through traps designated A, B and C. Trap A is cooled in solid carbon dioxide-trichloroethylene (−78° C.), trap B in a solid-liquid slurry of trichlorofluoromethane (−111° C.) and trap C in liquid nitrogen (−196° C.). This crude mixture was chromatographed as described previously. It was found to contain pentafluoroethyl oxyfluoride.

When fluoroxy group-containing compounds of the invention are mixed with lithium, hydrazine azide and a fluorocarbon polymer binder, the proportions being chosen to ensure substantailly stoichiometric reaction, the composition which results can be ignited as by means of a squib and large volumes of hot gases are produced.

What is claimed is:
1. Compounds of the formula

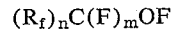

$$(R_f)_nC(F)_mOF$$

wherein R$_f$ represents a member of the group consisting of perfluoroalkyl radicals having from 1 to 18 carbon atoms, $n$ is an integer from 1 to 3, and $m$ is 3−$n$.
2. Perfluoroethyl oxyfluoride.
3. t-Perfluorobutyl oxyfluoride.
4. Perfluorohexyl oxyfluoride.
5. Perfluoroisopropyl oxyfluoride.
6. Perfluorodecyl oxyfluoride.
7. Heptafluoro n-propyl oxyfluoride.
8. Perfluoroethyl fluoroxydifluoromethyl peroxide.
9. Perfluoromethyl fluoroxydifluoromethyl peroxide.
10. Perfluoroethyl 1-fluoroxytetrafluoroethyl peroxide.
11. Perfluoromethyl 1-fluoroxytetrafluoroethyl peroxide.
12. 2-nitrotetrafluoroethyl oxyfluoride.
13. 2,2,2-trichloro-1,1-difluoroethyl oxyfluoride.
14. 2,2-dichloro-1,1,2-trifluoroethyloxyfluoride.
15. 2-chlorotetrafluoroethyl oxyfluoride.
16. 3-fluoroxytetrafluoropropionyl fluoride.

References Cited

UNITED STATES PATENTS 3,230,264   1/1966   Porter et al. _____ 20—453 XR

JOSEPH P. BRUST, *Primary Examiner.*

U.S. Cl. X.R.

23—88; 149—1, 19, 36, 109; 260—297, 544, 653